July 20, 1954  J. M. TEWKSBURY ET AL  2,684,480
PERMEABILITY GONIOMETER
Filed Feb. 8, 1952  3 Sheets-Sheet 1
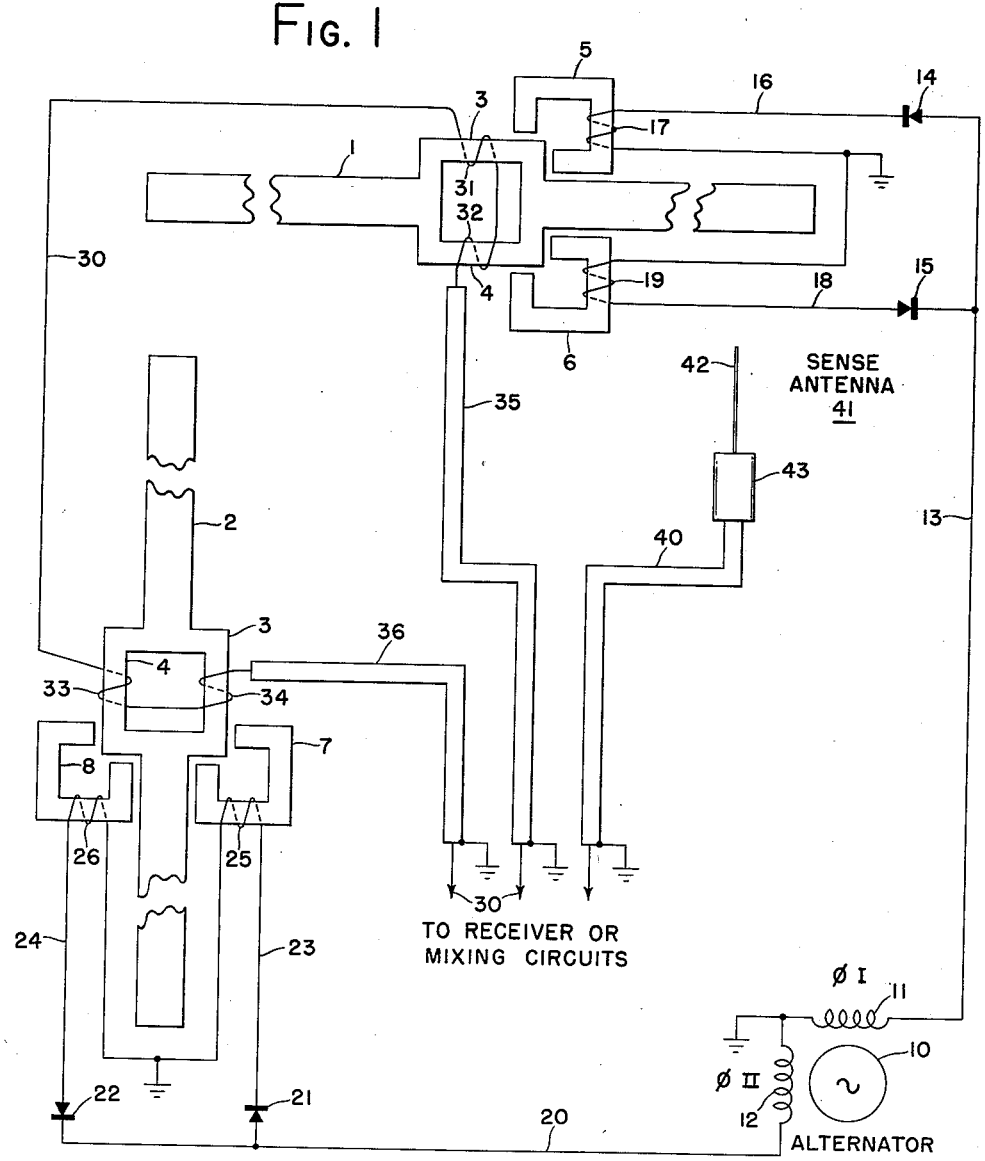
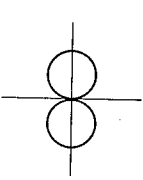
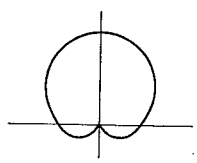
Fig. 3  Fig. 4
INVENTORS
JOHN M. TEWKSBURY
ALFRED A. HEMPHILL
BY
Killman and Kerst
ATTORNEYS

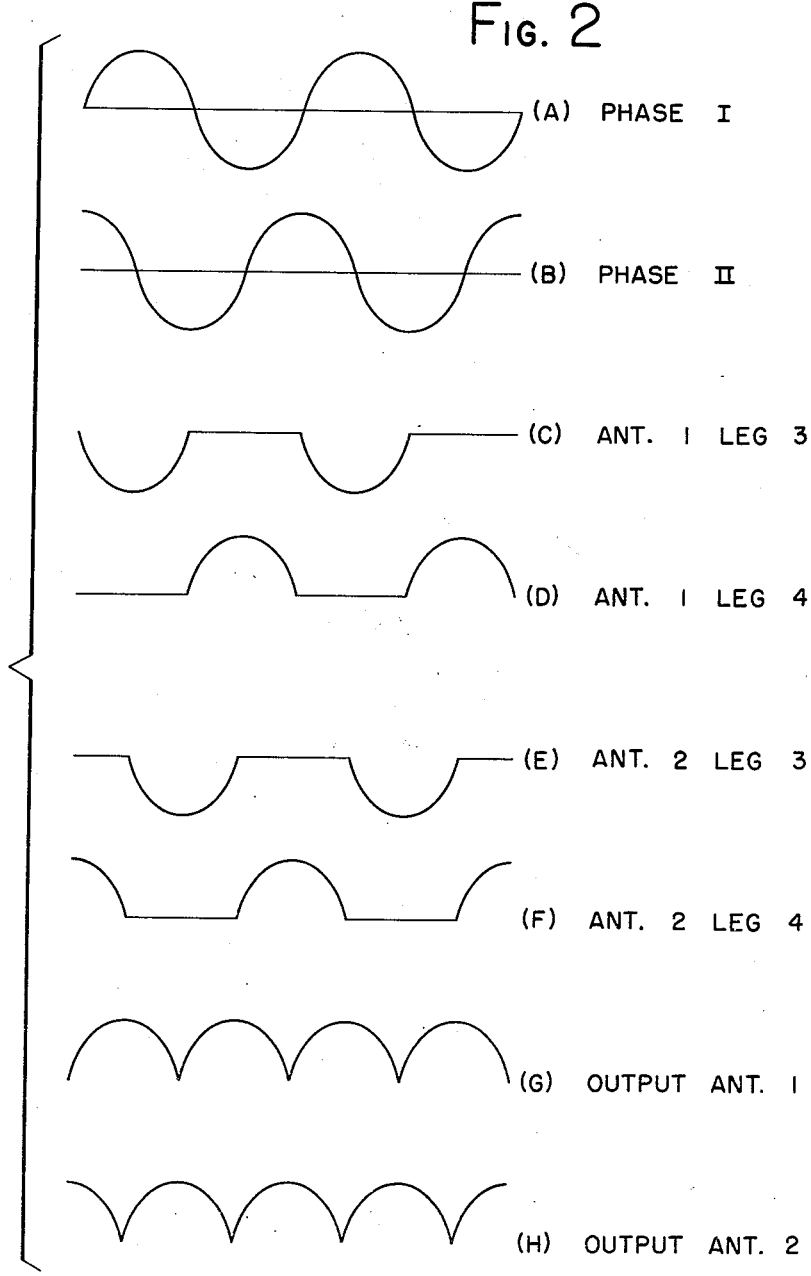

July 20, 1954

J. M. TEWKSBURY ET AL 2,684,480

PERMEABILITY GONIOMETER

Filed Feb. 8, 1952

INVENTORS
JOHN M. TEWKSBURY
ALFRED A. HEMPHILL

BY

*Killman and Kerst*

ATTORNEYS

Patented July 20, 1954

2,684,480

UNITED STATES PATENT OFFICE 2,684,480

PERMEABILITY GONIOMETER

John M. Tewksbury and Alfred A. Hemphill, Baltimore, Md., assignors to Bendix Aviation Corporation, Towson, Md., a corporation of Delaware Application February 8, 1952, Serial No. 270,613

3 Claims. (Cl. 343—121)

1

This invention relates to radio goniometers and more particularly to a goniometer arrangement having no physically rotating parts but which, nevertheless, operates to cause the rotation of a directional antenna response pattern.

In conventional direction finder practice pattern rotation of an antenna array is achieved by means of the movement of parts of the direction finder apparatus, for example, by rotation of an antenna array or by the rotation of a goniometer search coil or capacitor in systems using fixed arrays. This requirement is an undesirable one since it entails the use of a motor for driving purposes, adds to the complexity of the system, introduces sources of error and the limitations as to reliability, durability and performance that generally accompany the use of moving mechanical parts.

It is an object of this invention to provide a direction finder system requiring no moving parts.

It is another object of the invention to provide a goniometer having no moving parts.

It is a further object of the invention to provide a goniometer which is particularly adapted to use with arrays of magnetic antennas to form a direction finder system.

It is another object of the invention to provide a goniometer which is simple and rugged in construction.

It is an additional object of the invention to enable the rate of pattern rotation to be changed at will in a direction finder system, either throughout the entire rotation or over a chosen sector of each rotation.

The foregoing and other objects and advantages of the invention are realized by a goniometer utilizing a transformer type of coupling means with a highly permeable and easily saturable core of ferrite or similar materials. The antenna array may consist of a pair of wave transducing means with their axes of maximum response lying in mutual perpendicularity in a horizontal plane. Modulating voltage is applied in phase quadrature to the saturable cores of the transformers associated with the respective transducing means. The voltage applied to the transformers of each transducing means is split into two out-of-phase components and applied in a manner to polarize the response of the transducing means, the direction of polarization being reversed each half cycle of the modulating voltage. The outputs of the transducing means are combined to provide the familiar figure eight response pattern, which when combined with the output of a sense antenna produces a cardioid.

2

In the drawings:

Fig. 1 is a schematic circuit diagram of a direction finder system embodying the invention and utilizing magnetic antennas;

Fig. 2 is a graph showing the waveforms of the modulating voltages applied to the transformers of the system of Fig. 1 and the output voltages found at various points in the system;

Fig. 3 is a graph showing the figure eight response pattern of the system of Fig. 1 without a sense antenna;

Fig. 4 is a graph showing the cardioid pattern resulting from the addition of the sense antenna output; and, Fig. 5 is a schematic circuit diagram of a direction finder system embodying the invention and utilizing crossed dipole arrays of the Adcock type.

Figure 5:
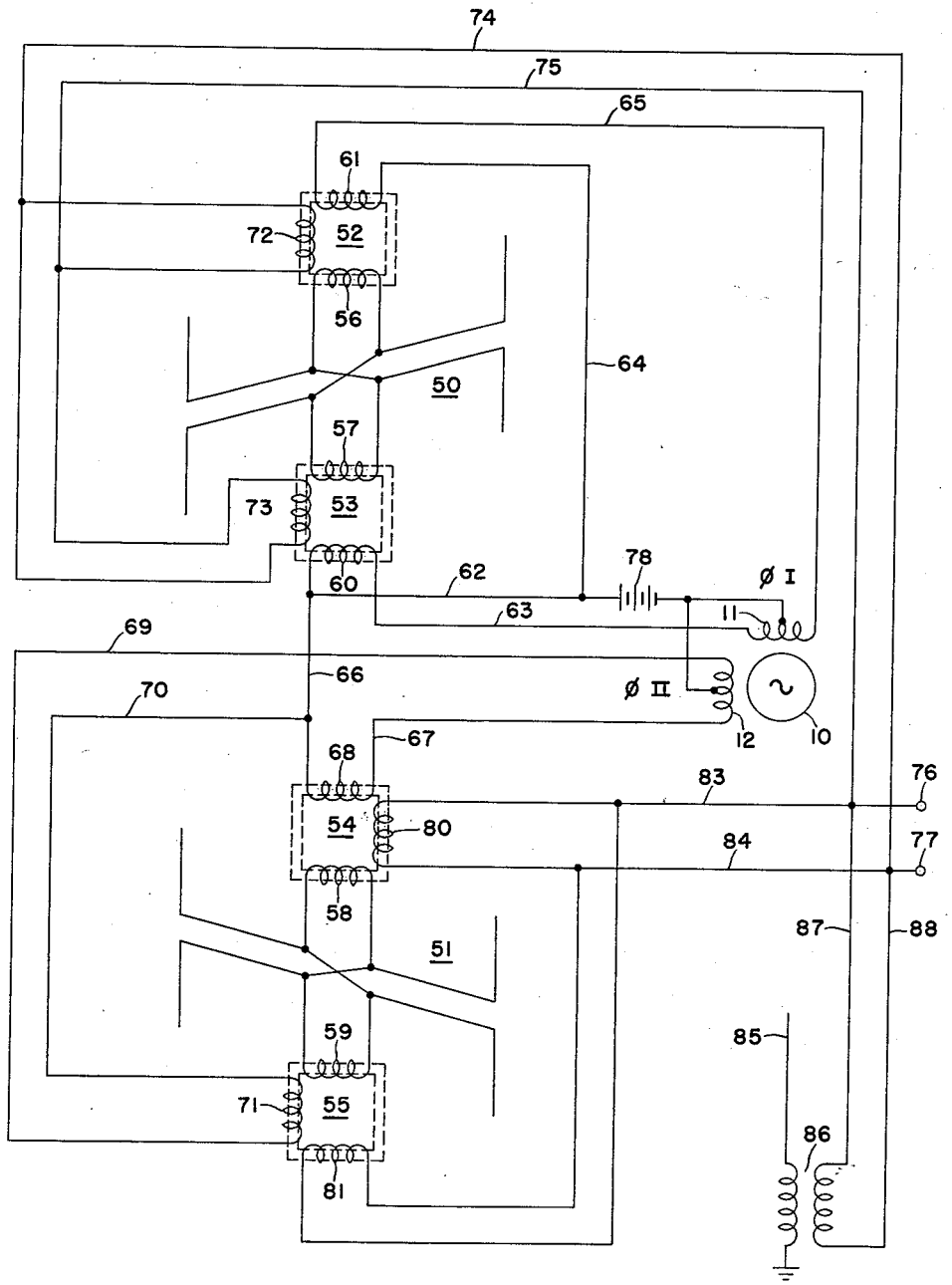

The system of Fig. 1 employs a pair of magnetic antennas 1 and 2 of the type disclosed in the application of Alfred Hemphill, Serial No. 264,717, filed January 3, 1952, entitled "Magnetic Antenna Systems." These antennas are constructed, as in the above referred to application, of highly permeable, easily saturable material such as ferrite. The central portion of each antenna is formed into a hollow square having a leg 3 and a leg 4. The antennas are orientated so that their longitudinal axes, which are normal to their axes of maximum response, lie in a horizontal plane in mutual perpendicularity.

Placed closely adjacent corresponding corners of both legs of each antenna are C-shaped cores of magnetic material such as transformer iron, those adjacent the legs 3 and 4 of antenna 1 being numbered 5 and 6 and those adjacent the legs 3 and 4 of antenna 2 being marked 7 and 8, respectively.

Modulation voltage is provided, at a low frequency of, for example, 30 cycles, by a source 10 which is indicated as a two-phase alternator having an output winding 11 for current of phase I and output winding 12 for current of phase II, the junction of the windings being grounded. Current of phase I is applied by a conductor 13 to a circuit comprising a pair of rectifiers 14 and 15 connected in parallel and in opposite orientation. The free terminal of rectifier 14 is connected by conductor 16 through a coil 17 wound on core 5 to ground. The free terminal of rectifier 15 is connected by a conductor 18 through a coil 19 wound on core 6 to ground.

Current of phase II is applied by a conductor 20 to a pair of rectifiers 21 and 22 which are connected thereto in opposite orientation and in parallel. The outputs of these rectifiers are applied by leads 23 and 24, respectively, to coils 25 and 26 wound on cores 7 and 8, respectively, the junction of these coils being grounded.

The output of the system as thus far described is derived by a conductor 30 which is wound to form serially connected but oppositely wound coils 31 and 32 about the legs 3 and 4, respectively, of antenna 1. The conductor 30 is also wound about the legs 3 and 4 of antenna 2 in the same manner to form coils 33 and 34. The free ends of conductor 30 are led through grounded shields 35 and 36 to receiver or mixing circuits.

A sense antenna forms part of the system. Any conventional type of omni-directional antenna may be employed for this purpose. The antenna illustrated at 41 is of the type in which the central conductor of a concentric feed line 40 is continued to form one element 42 of the antenna and the outer conductor is turned back to form a cylinder 43, the elements 42 and 43 constituting a half wavelength radiator. The feed line 40 is also led to the same receiver or mixer circuits as the conductor 30.

The operation of the system of Fig. 1 will be more clearly understood by reference to Fig. 2 which shows various waveforms existing therein. The operation of the magnetic antennas 1 and 2 is set forth in detail in application Serial No. 264,717 referred to above. In brief, however, antennas of this type are excited by the impingement thereon of the magnetic component of an electromagnetic wave. This generates magnetic flux in the antenna in the direction of its longitudinal axis, the amount of flux depending upon the strength of the wave and the direction of its travel relative to the antenna. The flux density is maximum for waves travelling in the direction perpendicular to the longitudinal axis of the antenna. The flux sets up voltage gradients along coils wound about the legs 3 and 4 and thus causes current flow therein.

Since the coils 31 and 32 are oppositely wound equal values of flux in legs 3 and 4 of antenna 1 will result in no output therefrom. It is only when unequal values of flux are caused to exist in the two legs that an output will result, and its phase will depend upon the leg in which the flux preponderates. Reversal of phase takes place when the preponderance of flux shifts from one leg to the other.

Control of the relative magnitude of flux in the two legs of each antenna is exerted by saturation of portions of the legs by means of the cores 5, 6, 7 and 8 and the coils wound upon them. Saturation of the portion of the leg 3 adjacent the core 5 can be accomplished, for example, by current flow through the coil 17.

Curves (A) and (B) of Fig. 2 indicate the waveforms existing in conductors 13 and 20, respectively, and their phase relationship. It will be noted that these waves are in phase quadrature. The waveform (A), being applied to rectifiers 14 and 15 in parallel, produces in the conductor 16 and in the coil 17 a current impulse for each negative half cycle thereof as indicated in curve (C). This impulse saturates the leg 3 during each of said negative half cycles with the result that the flux in that leg is greatly reduced and that in leg 4 produces an R. F. impulse in coil 32.

The positive half cycles of waveform (A) are passed by rectifier 15 as indicated by curve (D), saturating the leg 4 during these intervals and permitting flux in leg 3 to produce pulses of R. F. energy coil 31.

In the same manner current of phase II is applied through rectifiers 21 and 22 to coils 25 and 26 as indicated by curves (E) and (F).

In the event a signal is being received in a direction which coincides with the longitudinal axis of antenna 2, the output of antenna 1 will be a maximum and that of antenna 2 will be nil.

This will provide an output waveform for the system having an envelope as shown in curve (G) of Fig. 2. If the signal is being received in a direction which coincides with the longitudinal axis of antenna 1 the envelope of the system output will be that of the output of antenna 2 as indicated in curve (H) of Fig. 2. If the signal is originating in a direction which does not coincide with the longitudinal axis of either of the antennas then the system output will still resemble the curves (G) and (H) but the phase will be intermediate the two limiting phase conditions indicated by these curves. In this case both antennas contribute to the system output, the phase of the latter being determined by the direction of arrival of the signal.

The system output is recovered in conventional mixing and demodulating circuits which are not illustrated. The pattern of the output from the antennas 1 and 2 is the familiar figure eight pattern illustrated in Fig. 3. The addition of the output of the sense antenna 41 converts the figure eight pattern into the cardioid pattern illustrated in Fig. 4 in a known manner.

The system illustrated in Fig. 5 illustrates the application of the invention to antenna systems other than those employing magnetic antennas. There are shown a pair of H-type crossed dipole antennas 50 and 51, which are fixed and the longitudinal axes of which are mutually perpendicular. The antenna 50 has associated with it a pair of transformers 52 and 53 having cores of ferrite or similar material. A pair of transformers 54 and 55 are similarly associated with antenna 51. The transformer 52 has an input winding 56, the terminals of which are connected to the leads from the upper elements of the dipoles of antenna 50 on either side of the crossover point. Corresponding points on the leads from the lower elements of the dipoles are connected to the terminals of an input winding 57 of transformer 53. Transformers 54 and 55 are provided with input windings 58 and 59 connected to the leads from the upper and lower elements, respectively, of the antenna 51.

As in the system of Fig. 1, modulating energy is generated in a low frequency source 10, shown as a two-phase alternator with output windings 11 and 12. Energy of phase I from winding 11 is applied by leads 62 and 63 to a coil 60 on the core of transformer 53. It is also applied, in inverted phase, by leads 64 and 65 to a winding 61 on the core of transformer 52. Energy of phase II from winding 12 is applied by leads 66 and 67 to a coil 68 on the core of transformer 54. It is likewise applied by leads 69 and 70 in reversed phase to a winding 71 on transformer 55. Bias is supplied by a battery 78 common to both modulation circuits.

The output from antenna 50 is taken by windings 72 and 73 on transformers 52 and 53, respectively. The output from these windings is combined and applied by leads 74 and 75 to output terminals 76 and 77. In the same manner the output from antenna 51 is derived from windings 80 and 81 on transformers 54 and 55 and combined and applied by leads 83 and 84 to the terminals 76, 77.

A sense antenna 85 of conventional single element type is coupled by a transformer 86 to a pair of leads 87, 88 which apply its output to the terminals 76, 77.

In the operation of the system of Fig. 5 battery 78 causes a current to flow in winding 61 of transformer 52 through leads 64 and 65 and one half of winding 11 on alternator 10. The battery 78 also causes current to flow in winding 60 of transformer 53 through leads 62 and 63 and the other half of winding 11 on the alternator. The currents in the two halves of winding 11 are equal and opposite causing their fields to cancel. In the same manner the battery causes current to flow in winding 68 of transformer 54 and winding 71 of transformer 55. The currents in the two halves of winding 12 are equal and opposite so their fields cancel. The battery 78 is adjusted so the current is enough to partly saturate the transformer cores. Energy from alternator 10, winding 11 of waveform shown in curve (A), Fig. 2, is applied to winding 60 of transformer 53 and of opposite phase to winding 61 of transformer 52. Thus, when the A. C. current in 61 is in the same direction as the battery current, and the transformer 52 is saturated; the A. C. current in winding 60 is opposite the battery current and the transformer 53 is not saturated. The result is that the cores of transformers 52 and 53 are saturated in alternation. The two outputs are combined and applied by the leads 74, 75 to terminals 76, 77.

Energy of phase II, in quadrature with that of phase I, is applied to the cores of transformers 54 and 55. Energy of the waveform of curve (B), Fig. 2, is applied to winding 68 and energy of opposite phase is supplied to the winding 71. The outputs of these transformers are combined and applied by leads 83, 84 to terminals 76, 77.

The output of antennas 50, 51, when combined, is of the figure eight pattern of Fig. 3. The addition of the output of the sense antenna 85 converts it to the cardioid of Fig. 4.

While the description of the illustrated embodiments of the invention has been consistently referred thereto as devices for the reception of signals, it should be understood that the systems referred to can function as well for the transmission of signals having directional characteristics.

What is claimed is:

1. In apparatus of the character described, a pair of magnetic antennas each comprising an elongated member of magnetically permeable material having its central portion divided into two spaced portions of equal dimensions, said antennas being located in mutual proximity with their longitudinal axes in mutual perpendicularity, means magnetically saturating in alternation the central portions of each of said antennas at a rate which is lower than the frequency of signals to which said apparatus is responsive, the saturation of the portions of each of said antennas occurring in phase quadrature with the saturation of the portions of the other of said antennas, an output winding on each of said portions, and means combining the energy in said output windings.

2. In apparatus of the character described, a pair of magnetic antennas each comprising an elongated member of magnetically permeable material having its central portion divided into two spaced portions of equal dimensions, said antennas being located in mutual proximity with their longitudinal axes in mutual perpendicularity, means magnetically saturating in alternation the central portions of each of said antennas at a rate which is lower than the frequency of signals to which said apparatus is responsive, the saturation of the portions of each of said antennas occurring in phase quadrature with the saturation of the portions of the other of said antennas, an output winding on each of said portions, an antenna having a uniform azimuthal response located adjacent said magnetic antennas, and means combining the energy in said output windings and the output of said uniformly responsive antenna.

3. In apparatus of the character described, a pair of magnetic antennas each comprising an elongated member of magnetically permeable material having its central portion divided into two spaced portions of equal dimensions, said antennas being located in mutual proximity with their longitudinal axes in mutual perpendicularity, means providing alternating current in two components, the energy in said components being in phase quadrature, the frequency of said energy being lower than the frequency of signals to which the apparatus is responsive, a modulation winding associated with each of said portions, means magnetically coupling the energy of each of said modulation windings into a localized section of the portion with which it is associated, means applying the energy of a respective one of said components in phase opposition to the modulation windings of each of said antennas, thereby saturating the portions associated therewith in alternation, means deriving an electrical output from each of said portions which varies with the magnetic flux therein, an antenna having a uniform azimuthal response located adjacent said pair of antennas, and means combining the electrical outputs derived from all of said portions and the output of said uniformly responsive antenna.

References Cited in the file of this patent

UNITED STATES PATENTS

| Number | Name | Date |
|---|---|---|
| 2,199,819 | Galle | May 7, 1940 |
| 2,254,943 | Galle | Sept. 2, 1941 |
| 2,419,987 | Carlson | May 7, 1947 |

FOREIGN PATENTS

| Number | Country | Date |
|---|---|---|
| 493,574 | Great Britain | Oct. 11, 1938 |